(12) United States Patent
Glew et al.

(10) Patent No.: US 7,124,273 B2
(45) Date of Patent: Oct. 17, 2006

(54) METHOD AND APPARATUS FOR TRANSLATING GUEST PHYSICAL ADDRESSES IN A VIRTUAL MACHINE ENVIRONMENT

(75) Inventors: Andy Glew, Portland, OR (US); Michael A. Kozuch, Export, PA (US); Erich S. Boleyn, Portland, OR (US); Lawrence O. Smith, III, Beaverton, OR (US); Gilbert Neiger, Portland, OR (US); Richard Uhlig, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 637 days.

(21) Appl. No.: 10/084,282

(22) Filed: Feb. 25, 2002

(65) Prior Publication Data

US 2003/0163662 A1   Aug. 28, 2003

(51) Int. Cl.
*G06F 12/00* (2006.01)
(52) U.S. Cl. .............................. 711/202; 711/6; 711/206
(58) Field of Classification Search ................ 711/2, 711/6, 202–210; 718/1, 104
See application file for complete search history.

(56) References Cited

U.S. PATENT DOCUMENTS

| | | | |
|---|---|---|---|
| 3,996,449 A | 12/1976 | Attanasio | |
| 4,084,225 A | 4/1978 | Anderson et al. | |
| 4,247,905 A | 1/1981 | Yoshida et al. | |
| 4,347,565 A | 8/1982 | Kaneda et al. | |
| 4,430,709 A | 2/1984 | Schleupen | |
| 4,802,084 A | 1/1989 | Ikegaya | |
| 4,975,836 A | 12/1990 | Hirosawa | |
| 5,187,802 A | 2/1993 | Inoue | |
| 5,230,069 A * | 7/1993 | Brelsford et al. | 718/100 |
| 5,295,251 A | 3/1994 | Wakui | |
| 5,319,760 A | 6/1994 | Mason et al. | |
| 5,361,375 A | 11/1994 | Ogi | |
| 5,437,033 A | 7/1995 | Inoue et al. | |
| 5,469,557 A | 11/1995 | Salt | |
| 5,506,975 A | 4/1996 | Onodera | |
| 5,511,217 A | 4/1996 | Nakajima et al. | |
| 5,522,075 A | 5/1996 | Robinson et al. | |
| 5,555,385 A | 9/1996 | Osisek | |
| 5,555,414 A | 9/1996 | Hough | |
| 5,561,814 A * | 10/1996 | Glew et al. | 710/13 |
| 5,564,040 A | 10/1996 | Kubala | |
| 5,574,936 A | 11/1996 | Ryba | |
| 5,737,604 A | 4/1998 | Miller et al. | |
| 5,778,407 A * | 7/1998 | Glew et al. | 711/2 |
| 5,819,061 A | 10/1998 | Glassen et al. | |
| 5,854,913 A | 12/1998 | Goetz et al. | |
| 5,956,408 A | 9/1999 | Arnold | |
| 5,978,475 A | 11/1999 | Schneier | |

(Continued)

FOREIGN PATENT DOCUMENTS

DE     4217444     12/1992

(Continued)

OTHER PUBLICATIONS

Hennessy et al., Computer Organization and Design, 1998, 2nd Edition, pp. 579-602.*

(Continued)

*Primary Examiner*—Nasser Moazzami
(74) *Attorney, Agent, or Firm*—Thomas R. Lane (57) ABSTRACT

A method and an apparatus are used to efficiently translate memory addresses. The translation scheme yields a translated address, a memory type for the translated address, and a fault bit for the translation.

20 Claims, 7 Drawing Sheets

U.S. PATENT DOCUMENTS

| | | | |
|---|---|---|---|
| 6,044,478 | A | 3/2000 | Green |
| 6,075,938 | A | 6/2000 | Bugnion et al. |
| 6,088,262 | A | 7/2000 | Nasu |
| 6,093,213 | A | 7/2000 | Favor |
| 6,173,417 | B1 | 1/2001 | Merrill |
| 6,175,924 | B1 | 1/2001 | Arnold |
| 6,182,089 | B1 | 1/2001 | Ganapathy et al. |
| 6,188,257 | B1 | 2/2001 | Buer |
| 6,272,637 | B1 | 8/2001 | Little et al. |
| 6,275,933 | B1 | 8/2001 | Fine |
| 6,282,650 | B1 | 8/2001 | Davis |
| 6,314,409 | B1 | 11/2001 | Schneck et al. |
| 6,374,317 | B1 | 4/2002 | Ajanovic et al. |
| 6,378,068 | B1 | 4/2002 | Foster |
| 6,397,242 | B1 | 5/2002 | Devine et al. |
| 6,625,715 | B1 | 9/2003 | Mathews |
| 6,681,311 | B1 | 1/2004 | Gaskins et al. |

FOREIGN PATENT DOCUMENTS

| | | |
|---|---|---|
| EP | 0473913 | 3/1992 |
| EP | 0 549 931 A1 | 7/1993 |
| EP | 0 892 521 A2 | 1/1999 |
| EP | 0 961 193 A2 | 12/1999 |
| EP | 0 965 902 A2 | 12/1999 |
| EP | 1 055 989 A1 | 11/2000 |
| EP | 1 056 014 A1 | 11/2000 |
| EP | 1 085 396 A1 | 3/2001 |
| EP | 1 271 277 A2 | 1/2003 |
| JP | 02000076139 A | 3/2000 |
| WO | WO 95/24696 | 9/1995 |
| WO | WO 98/12620 A1 | 3/1998 |
| WO | WO 99/18511 | 4/1999 |
| WO | WO 99/18511 A1 | 4/1999 |
| WO | WO 99/65579 | 12/1999 |
| WO | WO 99/65579 A1 | 12/1999 |
| WO | WO 00/21238 | 4/2000 |
| WO | WO 01/63994 A2 | 8/2001 |
| WO | WO 01 75564 A | 10/2001 |
| WO | WO 02/01794 A2 | 1/2002 |
| WO | WO 02 17555 A | 2/2002 |
| WO | WO 02/060121 A1 | 8/2002 |
| WO | WO 02 086684 A | 10/2002 |
| WO | WO 03/058412 A1 | 7/2003 |

OTHER PUBLICATIONS

Hennessy, John L. and Patterson, David A. "Computer Organization and Design," Second Edition, Morgan Kaufman Publishers, San Francisco, CA, p. 579-602.

PCT Written Opinion for PCT International Patent Application No. US03/03797, mailed Oct. 27, 2004, 4 pages.

Coulouris, G. et al., "Distributed Systems: Concepts and Design", 2nd Edition, Addison-Wesley Publishers Ltd., Essex, England, pp. 422-424 (1994).

Crawford, J., "Architecture of the Intel 80386", Proceedings of the IEEE International Conference on Computer Design: VLSI in Computers (ICCD '86), ISBN 0-8186-0735-1, pp. 155-160 (Oct. 6-9, 1986).

Fabry, R.S., "Capability-Based Addressing", Communications of the ACM, vol. 17, No. 7, pp. 403-412 (Jul. 1974).

Frieder, G., "The Architecture and Operational Characteristics of the VMX Host Machine", IEEE Proceedings of the 15th Annual Workshop on Microprogramming, pp. 9-16, (Oct. 5, 1982).

Hewlett Packard Company, "Mobile Security Overview", pp. 1-9, (Sep. 2002).

IBM Corporation, "IBM ThinkPad T30 Notebooks", IBM Product Specification, located at www-1.ibm.com/services/files/cisco_t30_spec_sheet_070202.pdf, pp. 1-6 (Jul. 2, 2002).

Intel Corporation, "Intel 82802AB/82802AC Firmware Hub (FWH)", Intel Product Datasheet, Document No. 290658-004, pp. 1-6, 17-28 (Nov. 2000).

Menezes, Alfred J., et al., "Handbook of Applied Crytography", CRC Press Series on Discrete Mathematics and its Applications, Boca Raton, FL, ISBN 0849385237, pp. 403-405, 475, 506-515, 570 (Oct. 1996).

Nanba S. et al., "VM/4: ACOS-4 Virtual Machine Architecture", IEEE Proceedings of the 12th Annual Symposium on Computer Architecture, pp. 171-178 (Jun. 1985).

RSA Security Inc., "Hardware Authenticators", located at www.rsasecurity.com/node.asp?id =1158, pp. 1-2 (2004).

RSA Security Inc., "Software Authenticators", located at www.rsasecurity.com/node.asp?id =1313, pp. 1-2 (2004).

RSA Security Inc., "RSA SecurID Authenticators", located at www.rsasecurity.com/products/securid/datasheets/SID_DS_0103.pdf, pp. 1-2 (2003).

Schneier, B., "Applied Cryptography: Protocols, Algorithm, and Source Code in C", 2nd Edition, Wiley, John & Sons, Inc., ISBN 0471117099 (hardcover printing), pp. 47-52. 56-65, 169-187 (Oct. 1995).

Schneier, B., "Applied Cryptography: Protocols, Algorithm, and Source Code in C", 2nd Edition, Wiley, John & Sons, Inc., ISBN 0471128457 (softcover printing), pp. 28-33. 176-177, 216-217, 461-473, 518-522 (Nov. 1995).

Intel Corporation, "IA-64 System Abstraction Layer Specification", Intel Product Specification, Order No. 245359-001, 112 pages, Jan. 2000.

Intel Corporation, "Intel IA-64 Architecture Software Developer's Manual—vol. 2: IA-64 System Architecture", Intel Product Manual, Order No. 245318-001, pp. i, ii, 5.1-5.3, 11.1-11.8, 11.23-11.26, Jan. 2000.

Brands, Stefan, "Restrictive Blinding of Secret-Key Certificates", Springer-Verlag XP002201306, (1995),Chapter 3.

Davida, George I. et al., "Defending Systems Against Viruses through Cryptographic Authentication", Proceedings of the Symposium on Security and Privacy, IEEE Comp. Soc. Press, ISBN 0-8186-1939-2, (May 1989).

INTEL, "IA-32 Intel Architecture Software Developer's Manual Citation: vol. 3: System Programming Guide Miscellaneous Information", (2003), pp. 13-1 through 13-24.

Kashiwagi, Kazuhiko et al., "Design and Implementation of Dynamically Reconstructing System Software", Software Engineering Conference, Proceedings 1996 Asia-Pacific Seoul, South Korea Dec. 4-7, 1996, Los Alamitos, CA USA, IEEE Comput. Soc, US, ISBN 0-8186-7638-8, (1996).

Luke, Jahn et al., "Replacement Strategy for Aging Avionics Computers", IEEE AES Systems Magazine, XP002190614, (Mar. 1999).

Menezes, Oorschot, "Handbook of Applied Cryptography", CRC Press LLC, USA XP002201307, (1997), p. 475.

Richt, Stefan et al., "In-Circuit-Emulator Wird Echtzeittauglich", Elektronic Franzis Verlag GMBH, Munchen, DE, vol. 40, No. 16, XP000259620, (Aug. 6, 1991), pp. 100-103.

Saez, Sergio et al., "A Hardware Scheduler for Complex Real-Time Systems", Proceedings of the IEEE International Symposium on Industrial Electronics, XP002190615, (Jul. 1999), pp. 43-48.

Sherwood, Timothy et al., "Patchable Instruction ROM Architecture", Dept. of Computer Science and Engineering, University of California, San Diego, La Jolla, CA, (Nov. 2001).

"Information Display Technique for a Terminate Stay Resident Program," IBM Technical Disclosure Bulletin, TDB-ACC-No. NA9112156, Dec. 1, 1991, pp. 156-158, vol. 34, Issue No. 7A.

Karger, Paul A., et al., "A VMM Security Kernel for the VAX Architecture," Proceedings of the Symposium on Research in Security and Privacy, May 7, 1990, pp. 2-19, XP010020182, ISBN: 0-8186-2060-9, Boxborough, MA.

Chien, Andrew A., et al., "Safe and Protected Execution for the Morph/AMRM Reconfigurable Processor," 7th Annual IEEE Symposium, FCCM '99 Proceedings Apr. 21, 1999, pp. 209-221, XP010359180, ISBN: 0-7695-0375-6, Los Alamitos, CA.

Robin, John Scott and Irvine, Cynthia E., "Analysis of the Pentium's Ability to Support a Secure Virtual Machine Monitor," Proceedings of the 9th USENIX Security Symposium, Aug. 14, 2000, pp. 1-17, XP002247347, Denver, CO.

* cited by examiner

METHOD AND APPARATUS FOR TRANSLATING GUEST PHYSICAL ADDRESSES IN A VIRTUAL MACHINE ENVIRONMENT

FIELD OF THE INVENTION

This invention relates generally to computers, and more particularly to computer memory address translation.

BACKGROUND

A computer processor accesses system memory to retrieve or store data within the system memory. Specifically, the processor uses the physical address of data in the memory to identify and access the data. However, the physical address where data is stored in the memory is not the address that the processor uses to index the data during internal manipulations. Rather, the processor assigns a virtual address to data being processed according to program instructions. Thus, memory accesses often require the translation of virtual addresses into physical addresses.

Many processors use virtual or demand-paged memory schemes, where sections of an execution environment of a program are mapped into physical memory as needed. Virtual memory schemes allow the use of physical memory much smaller in size than the virtual address space of the processor and also provide a mechanism for memory protection so that multiple programs sharing the same physical memory do not adversely interfere with each other.

In a virtual memory scheme, the virtual and physical address spaces are divided into blocks of contiguous addresses, so that virtual and physical addresses belong to at most one block. The blocks can be of a constant size or can have variable sizes as dictated by system and/or program execution requirements.

These blocks are customarily referred to as pages if they are of a constant or fixed size. If variable sized blocks are used, the blocks are referred to as segments. Thus, the virtual address space may be divided into either segments or pages. A typical page size may be approximately 4 kilobytes.

DESCRIPTION OF THE DRAWINGS

Various embodiments are illustrated by way of example and not by way of limitation in the figures of the accompanying drawings in which like references indicate similar elements. It should be noted that references to "an," "one," or "various" embodiments in this disclosure are not necessarily to the same embodiment, and such references mean at least one.

DETAILED DESCRIPTION

Various embodiments disclosed herein implement an efficient address translation scheme that yields a translated address, a memory type for the translated address, and a fault bit for the translation. In the following description, for the purposes of explanation, numerous specific details are set forth in order to provide a thorough understanding of the various embodiments. It will be apparent, however, to one skilled in the art that the embodiments may be practiced without some of these specific details. For example, various signals, layout patterns and logical circuits may be modified according to the teachings of the various embodiments.

The following description and the accompanying drawings provide examples for the purposes of illustration. However, these examples should not be construed in a limiting sense as they are not intended to provide an exhaustive list of all possible implementations. In other instances, well-known structures and devices are omitted or simplified in order to avoid obscuring the details of the various embodiments.

Figure 1:
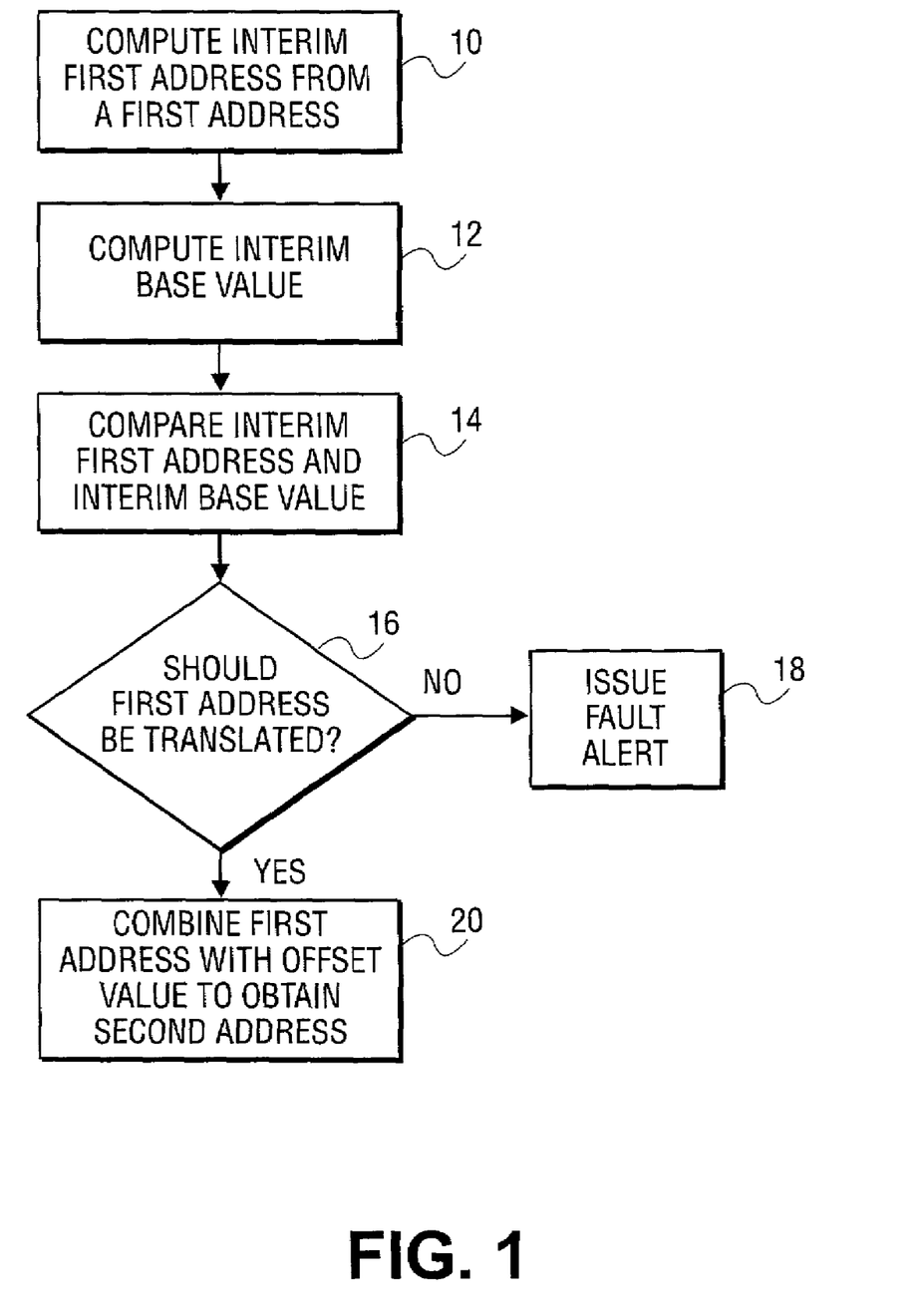
FIG. 1 is a flow chart showing one method of translating a first address into a second address in a virtual machine environment.

Referring now to FIG. 1, a flow chart is shown that illustrates a method of translating a first address into a second address in a virtual machine environment. In a virtual machine environment, the physical addresses produced under the control of the operating system (referred to herein as the guest operating system) are referred to as guest physical addresses (e.g., first address in FIG. 1). These guest physical addresses are translated into host physical addresses (e.g., second address in FIG. 1) by a virtual machine monitor depending on the content of a memory type assigned to the memory range associated with the physical address.

The memory type can be stored in multiple data structures and accessed as necessary. Among other data, the memory type indicates whether any translation should occur for physical addresses from a given address range and whether accesses to a given address range should cause a fault. In various embodiments, an offset bit in the memory type indicates whether translation should occur. If no translation should occur, then the translated address is the same as the physical address. If translation is permitted to occur, the matching and combining functions described below are performed.

At block 10 of FIG. 1, an interim first address is computed from a first address. The first address is associated with one of a plurality of segments of a physical address space (e.g., memory). Preferably, these segments are disjoint, meaning that the segments do not overlap.

Disjoint segments are desirable because each address only belongs to one segment. This eliminates the need for conflict resolution, which is necessary when two different mappings are produced by an address that belongs to two overlapping segments.

Assuming the memory type for the first address indicates that translation should occur, an interim base value is computed from a base value associated with the first address at block 12. The interim first address and the interim base value are compared at block 14. At decision block 16, it is determined whether the first address should be translated.

The decision at block 16 is based on whether the interim first address and the interim base value "match," as shown by the comparison carried out at block 14. If the interim first address and the interim base value match, the first address can be translated. The match function is performed to verify that a valid translation exists for the first address.

In various embodiments, the following equation is used to determine whether the interim first address and the interim base value match:

(Address&Mask)=(Base&Mask)  Equation 1

The left side of the equation represents the interim first address, and the right side of the equation represents the interim base value. Specifically, a Mask value associated with the first address is separately applied (e.g., with a logical AND function) to both the first address and the base value.

Every bit position specified by Mask is retained for comparison. For example, if the Mask value is 11110000, then the four most significant bits of the first address (e.g., the interim first address once the Mask is applied) would be retained for comparison with the interim base value (e.g., the four most significant bits of the base value).

If the values on each side of the equation are equivalent, then the interim first address and the interim base value match. If not, there is not a valid translation for the first address.

It is worth noting that other matching mechanisms can be used. For example, a range check can be used to determine whether a first address can be validly translated.

Regardless of the matching mechanism used, if there is a match and the memory type indicates that an offset should be applied, the first address is "combined" with an offset value to obtain a second address (e.g., translated address) at block 20. If there is no match, a fault alert is issued at block 18. The respective actions taken at block 20 and block 18 will be discussed in turn.

If a match occurs, the combining function of block 20 in one embodiment is a bitwise logical operation similar to the matching equation (e.g., Equation 1) described above. Specifically, the following equation is used to translate the first address, $Address_1$, to obtain the second address, $Address_2$:

$Address_2$=($Address_1$&~Mask)|(Offset&Mask)  Equation 2

The "&" represents the logical AND function, and the "|" represents the logical OR function. The "~" represents the inverse of the value immediately following.

Thus, the Offset bits specified by Mask will replace the $Address_1$ bits specified to be replaced by ~Mask. For example, if $Address_1$ is AAAAAAAA, Offset is TTTTTTTT, and Mask is 11110000, then $Address_2$ will be TTTTAAAA. This result is due to the fact that Mask specified that the four most significant bits of Offset should replace the four most significant bits of $Address_1$, and ~Mask specified that the four least significant bits of $Address_1$ should be retained.

In other embodiments, the combining function of block 20 is accomplished by adding the offset value to the first address to obtain the second address.

Various embodiments further include determination of the memory type of the translated address. This determination process is conducted either concurrently with translation or after the translation is complete. In one embodiment, the memory type for the translated address is associated with the base value that matched the physical address.

Focusing now on block 18, a fault alert is issued to indicate that no mapping exists for the physical address. Typically, no mapping will exist for a physical address if the guest operating system attempts to access a region of memory that does not have a device or address that should respond to such an access attempt.

The fault alert can also entail a notification that an attempt has been made to access a particular segment (e.g., the segment to which the physical address belongs). For example, such a notification can be issued upon the detection of whether a fault bit has been set for the particular segment. Depending on the embodiment, the fault bit can be set in one or more values. In one embodiment, the fault bit is set in the memory type associated with the base value that matched the physical address to be translated.

Figure 2:
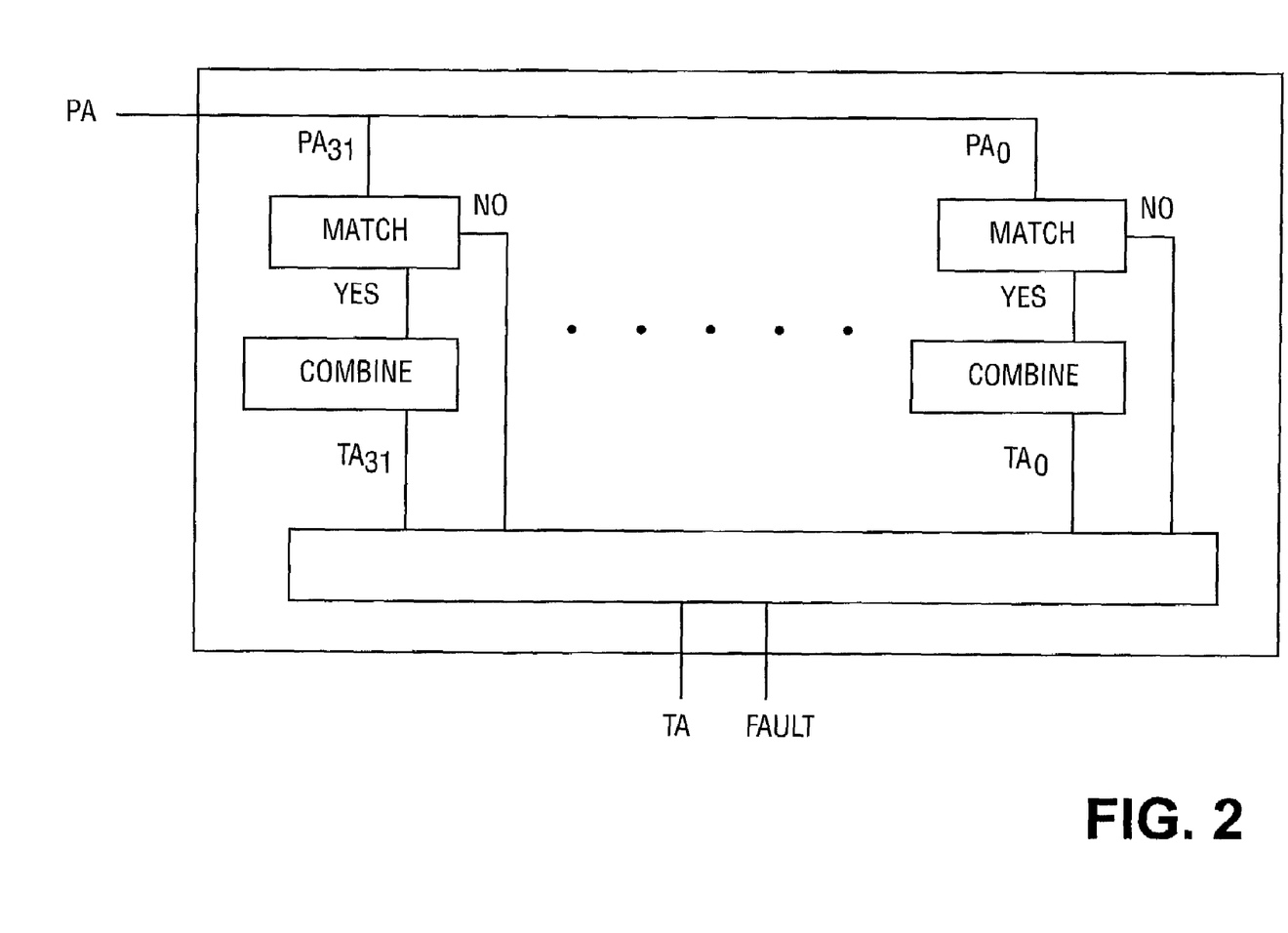
FIG. 2 is a logical diagram that illustrates how the matching and combining functions of various embodiments interact to accomplish virtual machine translation.

FIG. 2 is a logical diagram that shows one embodiment of the interaction between the matching and combining functions described above. Although a 32-bit address is shown, the various embodiments described herein can be adapted for more than or less than 32 bits. Each bit of the 32 bit physical address, PA, is analyzed to determine whether there is a match. As long as all of the bits match, a translated address, TA, will be produced. However, if there is not a complete match, a fault notification may be issued depending on the system configuration.

For example, when a physical address bit matches, the matched bit is combined with the appropriate bit from the offset value, as previously described, to obtain a translated bit. The translated bit is combined with all of the other properly matched and translated bits to form the translated address.

Figure 3:
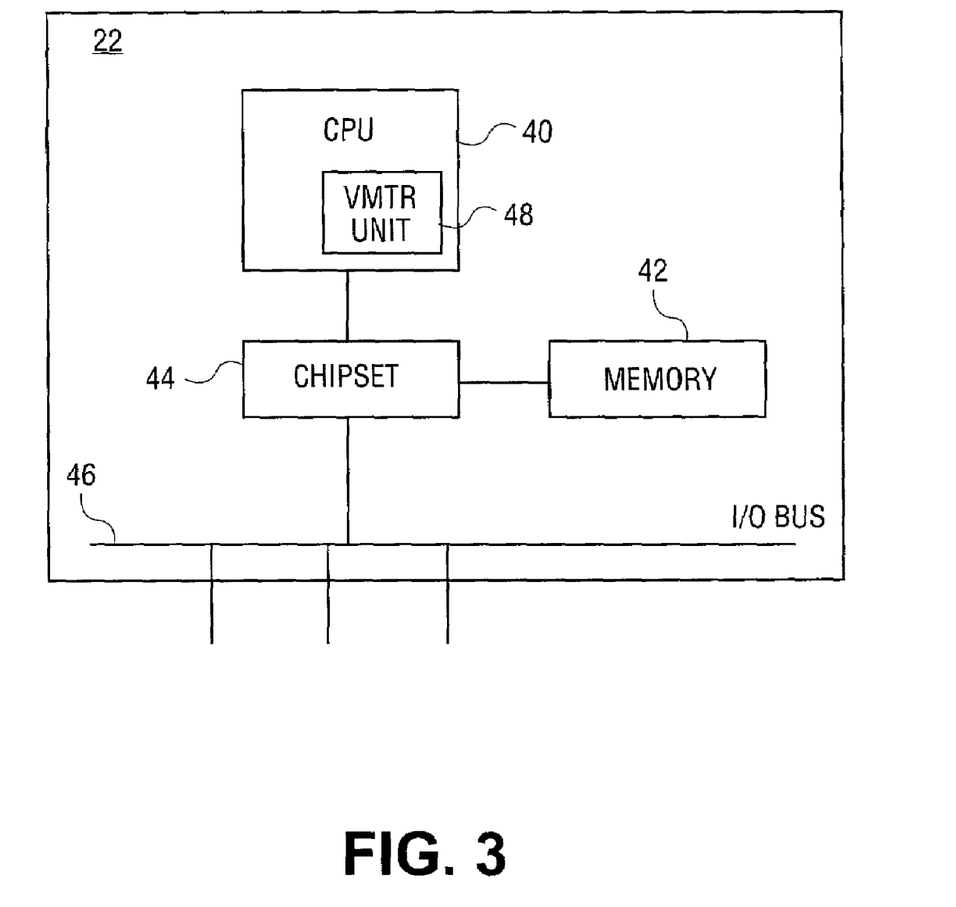
FIG. 3 is a diagram of a computer system with a virtual machine translation ("VMTR") unit disposed in the central processing unit.

FIG. 3 shows an example of computer system 22 with virtual machine translation ("VMTR") unit 48 to perform address translation described above. Specifically, computer system 22 includes central processing unit ("CPU") 40, memory 42 coupled to central processing unit 40, virtual machine translation unit 48 disposed within central processing unit 40, and chipset 44. Although FIG. 3 shows virtual machine translation unit 48 disposed within central processing unit 40, it is contemplated to have virtual machine translation unit 48 located elsewhere within computer system 22 or even remote from, yet coupled to, computer system 22. Computer system 22 communicates with external devices (e.g., keyboard, mouse, monitor, etc.) via input/output bus 46.

In an embodiment, computer system 22 includes memory 42, at least a portion of which is divided into a plurality of segments, comparison logic circuitry coupled to the memory, and combination logic circuitry coupled to the comparison logic circuitry and to the memory. Although not shown in FIG. 3, the comparison logic circuitry and the combination logic circuitry are disposed within virtual machine translation unit 48.

Figure 4:
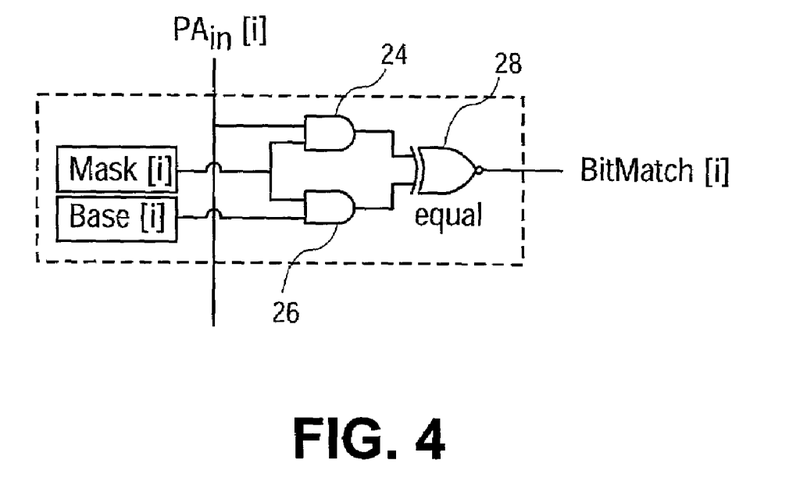
FIG. 4 is a logical diagram that illustrates how the bitwise matching function of an embodiment is accomplished with a mask value and a base value.
Figure 7:
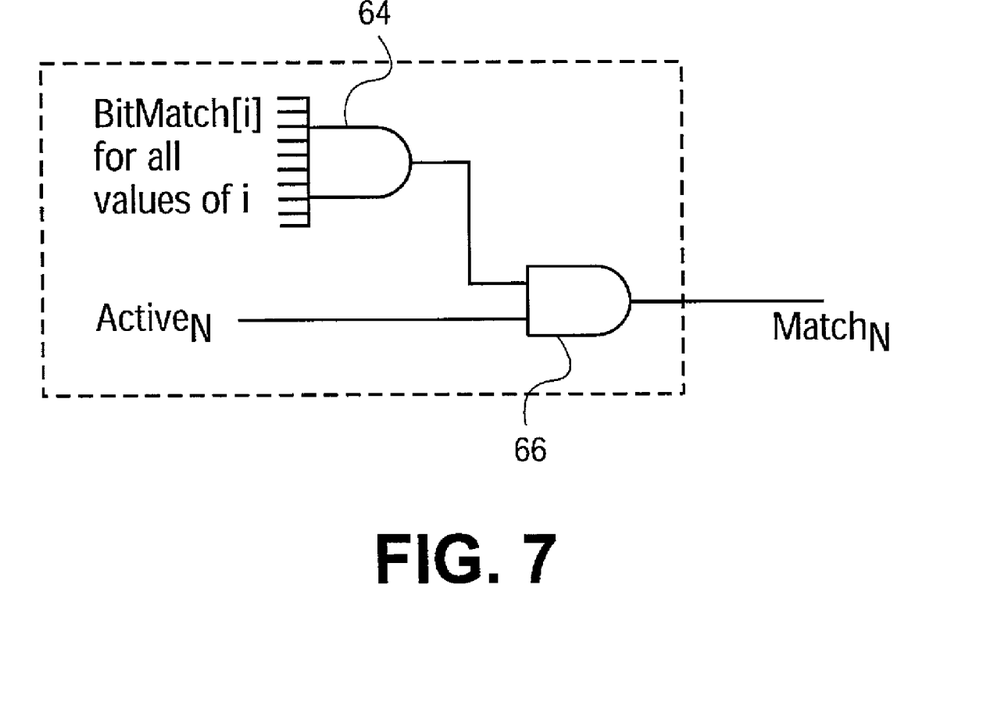
FIG. 7 is a logical diagram that illustrates an embodiment that verifies that each bit matches and that the appropriate memory type range register is active.

FIGS. 4 and 7 show a logical representation of the comparison logic circuitry. Specifically, the comparison logic circuitry is designed to conduct the matching operation set forth in Equation 1 above. As shown in FIG. 4, the interim first address is computed with AND gate 24, and the interim base value is computed with AND gate 26. Gate 28 is an inverted exclusive OR gate, which means that gate 28 determines whether the output from gate 24 and the output from gate 26 are equal. If so, there is a match. If not, there is no match.

This matching operation is carried out on a bit-by-bit basis and may be carried out in parallel. Once the matching operation is carried out for every bit (e.g., BitMatch[i] determined for all values of i), an overall match, $Match_N$, is determined, as shown in FIG. 7. Specifically, AND gate 64 verifies that every bit of the physical address matches. If every bit matches and the appropriate memory type range register, discussed in detail below, is active (e.g., identified by Active$_N$ signal), AND gate 66 generates output Match$_N$ to indicate that translation can occur. Alternatively, Match$_N$ can indicate that no translation should occur such that the final physical address is the same as the input physical address. This can happen as a result of the physical address not matching or the memory type range register being inactive.

Figure 5:
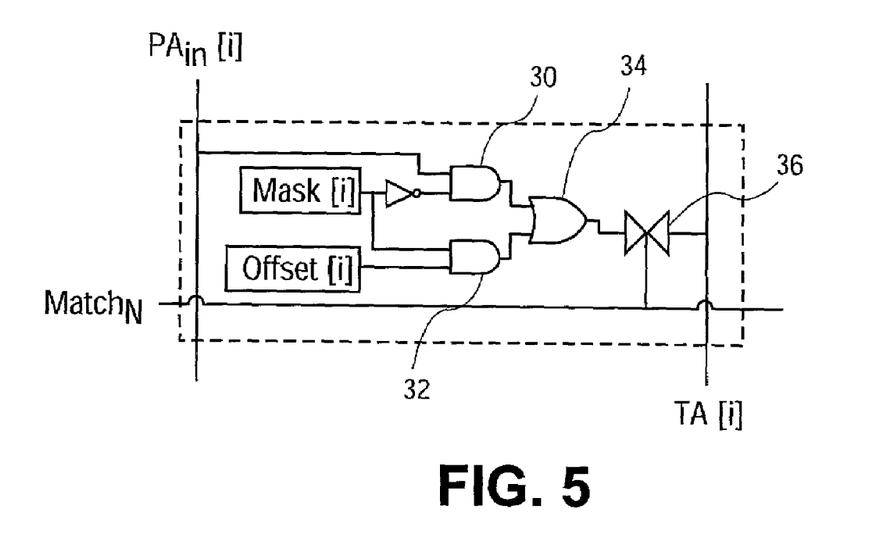
FIG. 5 is a logical diagram that illustrates how the combining function of an embodiment is accomplished with a mask value and an offset value.

FIG. 5 shows a logical representation of the combination logic circuitry. Specifically, the combination logic circuitry is designed to conduct the combining operation set forth in Equation 2 above. AND gate 30 is used to determine which bits of the physical address, PA, are to be retained in the translated address, TA. AND gate 32 is used to determine which bits of the Offset value are to replace the physical address bits that are not to be retained in the translated address.

The translated address is calculated by OR gate 34. Pass gate 36 will only allow the signal from OR gate 34 to pass as the translated address if Match$_N$ (from FIG. 7) indicates that the physical address should be translated. As indicated in FIG. 2, the match function (FIGS. 4 and 7) and the combining function (FIG. 5) are conducted on a bit-by-bit basis in various embodiments.

Figure 6A:
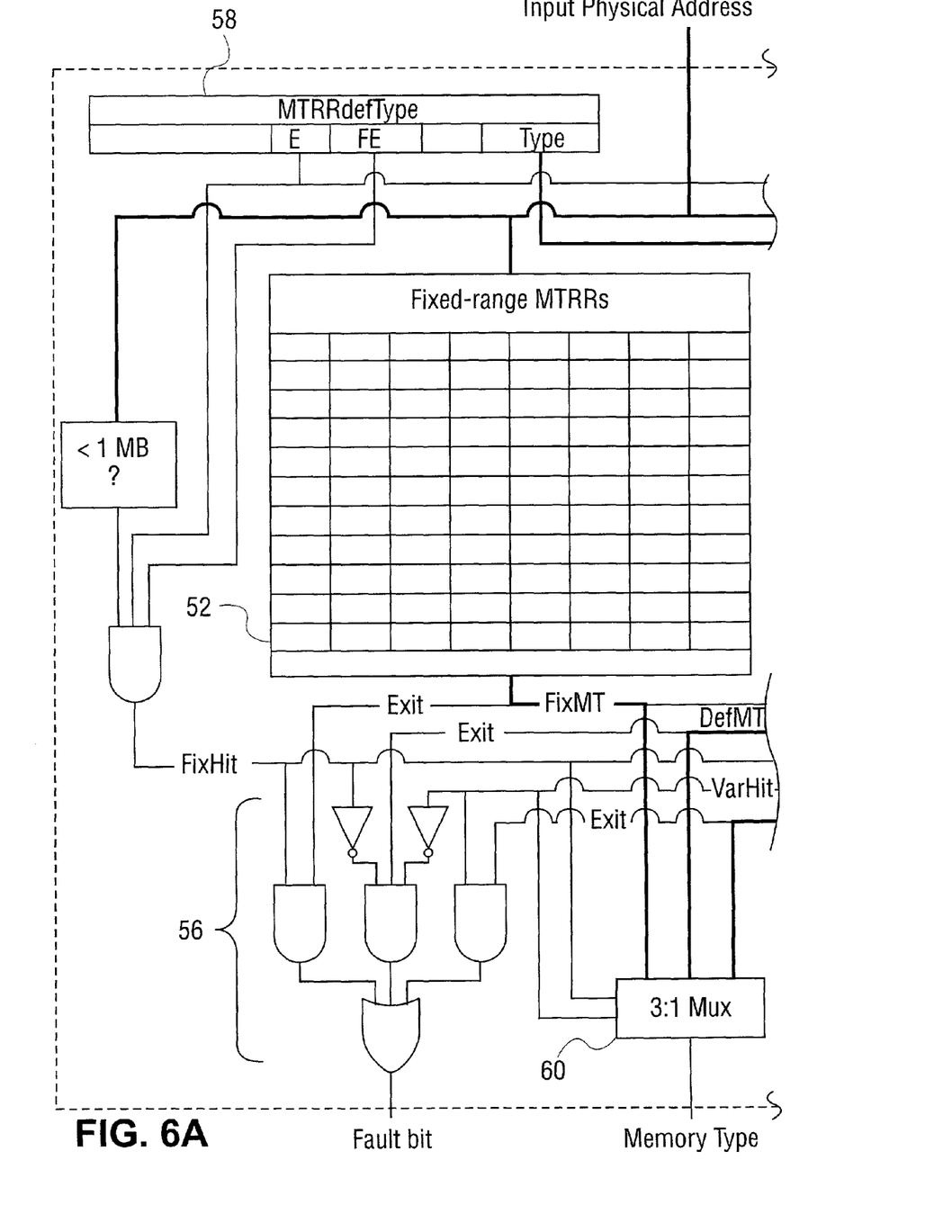
FIGS. 6A and 6B illustrate the logic required by one embodiment to conduct virtual machine translation to obtain a translated address, a memory type for the translated address, and a fault bit for the translation.
Figure 6B:
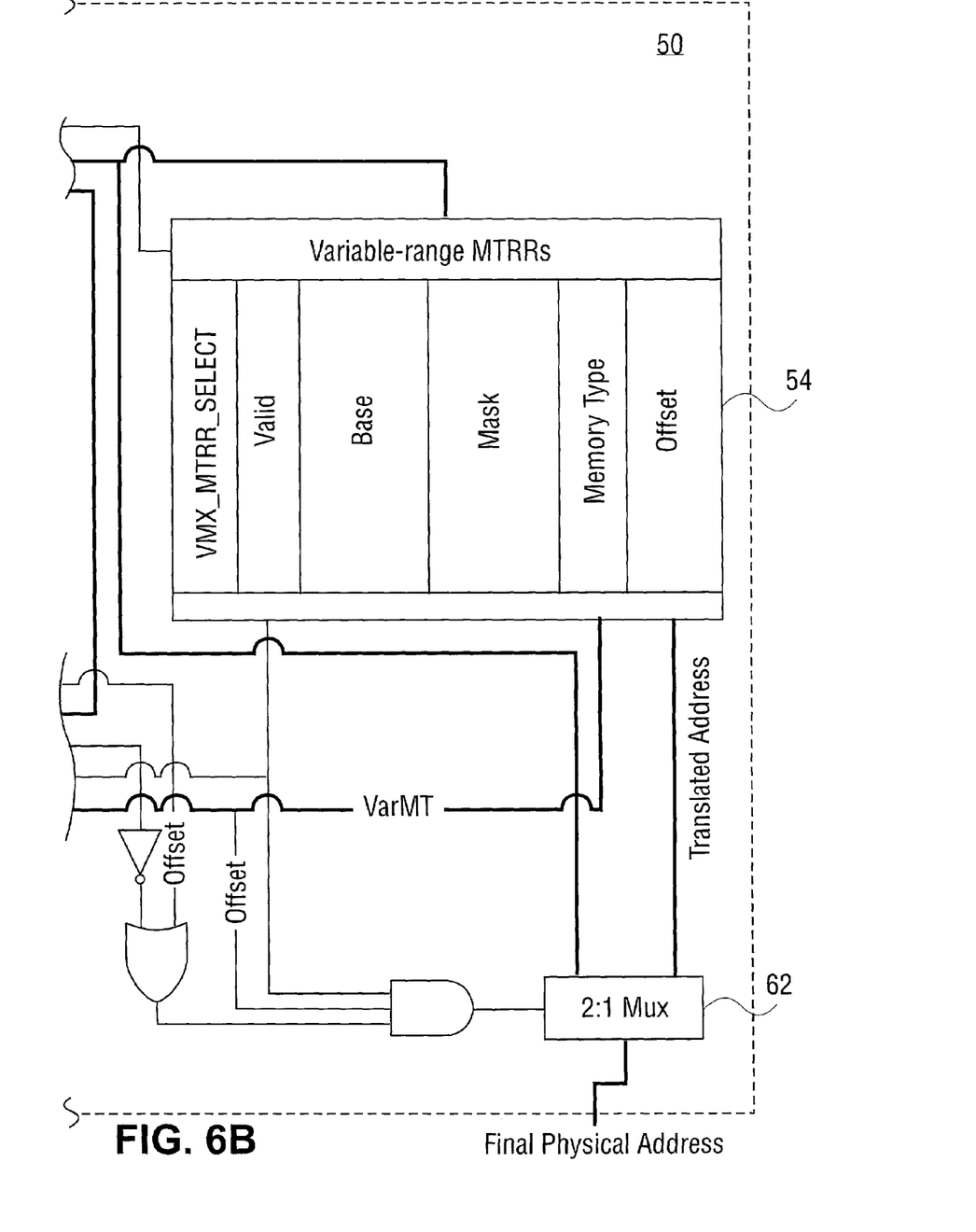

FIGS. 6A and 6B show a logical diagram of an embodiment for Intel 32-bit architecture processors in which a translated address and memory type ("MT") are derived from the input physical address. Specifically, translation unit 50 includes table 52 of fixed-range memory type range registers ("MTRRs"). In the embodiment shown, these fixed range MTRRs provide memory types for addresses in the range between zero and one megabyte. However, this fixed range can vary. Here, zero to one megabyte is chosen because, historically, this range of memory has been highly fragmented.

Translation unit 50 also includes table 54 of variable range MTRRs. The variable range MTRRs define the memory type for a number of variable size ranges. The ranges are defined by a base value and a mask value. Each range is also associated with a valid bit, a memory type (which can include a fault bit and an offset bit, the offset bit to indicate whether or not to translate), and an offset value. These values are used, as described above, to determine whether to translate a first address and, if necessary, to translate the first address.

Fault detection logic 56 represents fault detection circuitry coupled to comparison logic circuitry (the logical representation of which is shown in FIGS. 4 and 7). Fault detection logic 56 is configured to detect and issue fault alerts based on user preferences. As described above, the fault alerts can be issued if no mapping exists or if an attempt is made to access a particular segment.

MTRRdefType register 58 controls the operation of translation unit 50. Specifically, MTRRdefType register 58 has an enable field ("E") that controls whether the MTRRs, both fixed and variable, are active. The fixed enable field ("FE") of MTRRdefType register 58 controls whether the fixed range registers are enabled. Thus, when the enable field indicates that the MTRRs are active, translation can occur. If the MTRRs are inactive, the memory type specified by the Type field from MTRRdefType register 58 is used.

Thus, translation unit 50 takes an Input Physical Address (e.g., first address) and translates the address, if necessary, and outputs the Final Physical Address (e.g., second address), the memory type for the Final Physical Address, and a Fault Bit. Multiplexer 60 outputs a memory type from either table 52 of fixed range MTRRs, table 54 of variable range MTRRs, or from MTRRdefType register 58.

Multiplexer 62 outputs an address based on whether the offset bit is set. If the offset bit indicates that no translation should occur, the Final Physical Address will be the same as the Input Physical Address. If the offset bit indicates that the address should be translated, the translated address obtained from table 54 of variable range MTRRs (e.g., via matching and combining described above) will be the Final Physical Address.

It is to be understood that even though numerous characteristics and advantages of various embodiments have been set forth in the foregoing description, together with details of structure and function, this disclosure is illustrative only. Changes may be made in detail, especially matters of structure and management of parts, without departing from the scope of the various embodiments as expressed by the broad general meaning of the terms of the appended claims.

We claim:

1. A method comprising:
   dividing a physical address space into a plurality of segments;
   computing an interim first address from a physical address from the physical address space;
   computing an interim base value from a base value associated with the physical address;
   comparing the interim first address and the interim base value to determine whether the physical address can be validly translated to obtain a translated address; and
   if the physical address can be validly translated, combining the physical address with an offset value to obtain the translated address.

2. The method of claim 1, further comprising:
   determining a memory type of the translated address.

3. The method of claim 2, wherein determining comprises:
   reading the memory type from the base value associated with the physical address.

4. The method of claim 1, wherein computing the interim first address comprises:
   determining which bits of the physical address should be retained in the interim first address for comparison with the interim base value,
   and wherein computing the interim base value comprises:
   determining which bits of a base value should be retained in the interim base value for comparison with the interim first address.

5. The method of claim 4, wherein determining which bits of the physical address and which bits of the base value should be retained for comparison comprises:
   applying a mask value to each of the physical address and the base value, the mask value associated with the physical address.

6. The method of claim 1, wherein combining comprises:
   determining which bits of the physical address should be retained in the translated address; and
   substituting bits from the offset value for bits of the physical address which are not to be retained in the translated address.

7. The method of claim 6, wherein determining which bits comprises:
   applying a mask value to the physical address, the mask value associated with the physical address.

8. The method of claim 1, further comprising:
   issuing a fault alert.

9. The method of claim 8, wherein issuing the fault alert comprises:
issuing a notice that no mapping exists for the physical address.

10. The method of claim 8, wherein issuing the fault alert comprises:
issuing a notice that an attempt has been made to access a particular segment.

11. The method of claim 10, wherein issuing the notice comprises:
detecting whether a fault bit has been set for the particular segment.

12. The method of claim 1, wherein if the physical address cannot be validly translated, the translated address is the same as the physical address.

13. An apparatus comprising:
a memory having a first address space divided into a plurality of segments;
comparison logic circuitry coupled to the memory to create an interim first address from a first address from one of the plurality of segments, to create an interim base value, and to compare the interim first address and the interim base value to determine whether the first address belongs to a segment that can be validly translated to obtain a second address; and
combination logic circuitry coupled to the comparison logic circuitry and to the memory, the combination logic circuitry to combine the first address with an offset value to obtain the second address if the comparison logic circuitry indicates that the first address can be validly translated.

14. The apparatus of claim 13, wherein the comparison logic circuitry comprises:
masking circuitry to apply a mask value to the first address to obtain the interim first address and to apply the mask value to a base value to obtain the interim base value, the mask value associated with the first address.

15. The apparatus of claim 13, wherein the combination logic circuitry comprises:
masking circuitry to apply a mask value to the first address to determine which bits of the first address should be retained in the second address; and
substitution circuitry to substitute bits from the offset value for bits of the first address which are not to be retained in the second address.

16. The apparatus of claim 13, further comprising:
fault detection circuitry coupled to the comparison logic circuitry, the fault detection circuitry to detect and issue fault alerts.

17. A system comprising:

a processor;

memory coupled to the processor, the memory having a first address space divided into a plurality of segments;

comparison logic circuitry coupled to the memory to create an interim first address from a first address from one of the plurality of segments, to create an interim base value, and to compare the interim first address and the interim base value to determine whether the first address belongs to a segment that can be validly translated to obtain a second address; and combination logic circuitry coupled to the comparison logic circuitry and to the memory, the combination logic circuitry to combine the first address with an offset value to obtain the second address if the comparison logic circuitry indicates that the first address can be validly translated.

18. The system of claim 17, wherein the comparison logic circuitry comprises:
masking circuitry to apply a mask value to the first address to obtain the interim first address and to apply the mask value to a base value to obtain the interim base value, the mask value associated with the first address.

19. The system of claim 17, wherein the combination logic circuitry comprises:
masking circuitry to apply a mask value to the first address to determine which bits of the first address should be retained in the second address; and
substitution circuitry to substitute bits from the offset value for bits of the first address which are not to be retained in the second address.

20. The system of claim 17, further comprising:
fault detection circuitry coupled to the comparison logic circuitry, the fault detection circuitry to detect and issue fault alerts.

* * * * *